(12) United States Patent
Uchida

(10) Patent No.: US 7,442,226 B2
(45) Date of Patent: Oct. 28, 2008

(54) ULTRAFINE METAL POWDER SLURRY

(75) Inventor: Morishige Uchida, Chiba (JP)

(73) Assignee: JFE Mineral Company, Ltd., Tokyo (JP)

( * ) Notice: Subject to any disclaimer, the term of this patent is extended or adjusted under 35 U.S.C. 154(b) by 27 days.

(21) Appl. No.: 11/189,736

(22) Filed: Jul. 27, 2005

(65) Prior Publication Data

US 2006/0021465 A1 Feb. 2, 2006

(30) Foreign Application Priority Data

Jul. 30, 2004 (JP) ............................. 2004-223699

(51) Int. Cl.
*B22F 1/00* (2006.01)
*H01B 1/22* (2006.01)
(52) U.S. Cl. ..................... 75/252; 252/512; 252/513; 252/514
(58) Field of Classification Search ................ 75/252; 252/512, 513, 514
See application file for complete search history.

(56) References Cited

U.S. PATENT DOCUMENTS

| 3,711,428 | A | * | 1/1973 | Aycock et al. | ............... 252/502 |
|---|---|---|---|---|---|
| 4,153,754 | A | * | 5/1979 | Huisman | ................. 428/843.1 |
| 5,064,550 | A | * | 11/1991 | Wyman | .................... 252/62.52 |
| 6,199,747 | B1 | * | 3/2001 | Cohn et al. | ................. 228/119 |
| 6,312,496 | B1 | | 11/2001 | Katayama et al. | |
| 6,447,571 | B1 | * | 9/2002 | Ito et al. | ....................... 75/255 |
| 6,551,527 | B2 | * | 4/2003 | Yoshida et al. | ............... 252/512 |
| 6,620,220 | B2 | | 9/2003 | Ito et al. | |
| 6,881,239 | B2 | | 4/2005 | Uchida | |

FOREIGN PATENT DOCUMENTS

| EP | 1 323 485 A1 | 7/2003 |
|---|---|---|
| JP | A-63-232402 | 9/1988 |
| JP | 2003-342607 | 12/2003 |

* cited by examiner

*Primary Examiner*—Roy King
*Assistant Examiner*—Ngoclan T Mai
(74) *Attorney, Agent, or Firm*—Oliff & Berridge, PLC

(57) ABSTRACT

In an ultrafine metal powder slurry containing an organic solvent, a surfactant, and an ultrafine metal powder, the surfactant is oleoyl sarcosine, the content of the ultrafine metal powder in the ultrafine metal powder slurry is 70 to 95 percent by mass, and more than 0.05 to less than 2.0 parts by mass of the surfactant is contained relative to 100 parts by mass of the ultrafine metal powder. By the above slurry, reduction in labor and treatment time can be realized in a conductive paste forming process. In addition, since aggregation of particles of the ultrafine metal powder is prevented, an ultrafine metal powder slurry can be provided having superior dispersibility and dry film density.

7 Claims, 2 Drawing Sheets

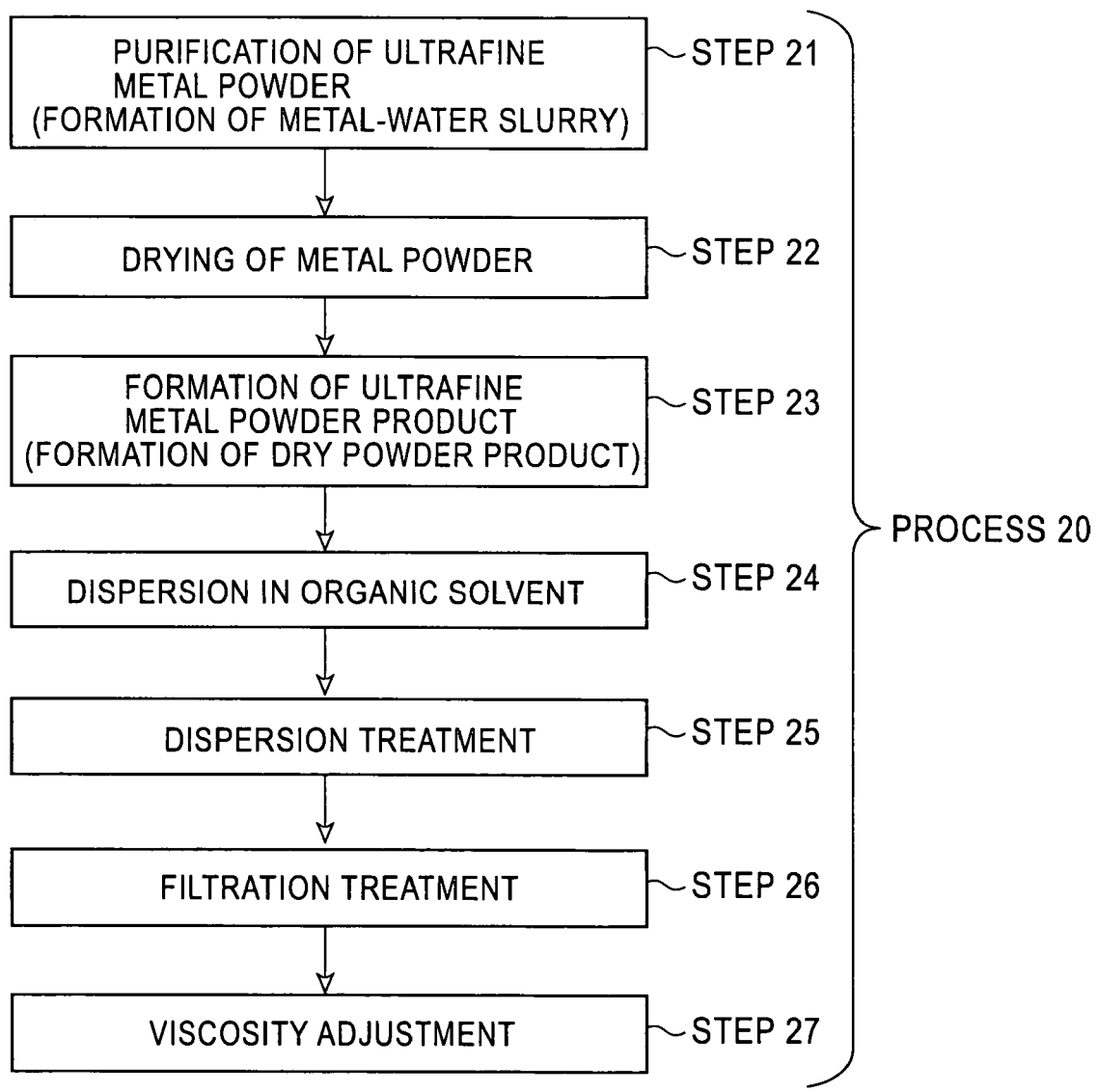

ULTRAFINE METAL POWDER SLURRY

BACKGROUND

The present invention relates to an ultrafine metal powder slurry, and more particularly, relates to an ultrafine metal powder slurry with superior dispersibility, which is used for conductive paste fillers, internal electrodes of multilayer ceramic capacitors, and the like.

An ultrafine metal powder, such as an ultrafine nickel powder, used for internal electrodes of multilayer ceramic capacitors is a powdered high purity metal composed, for example, of particles having an approximately spherical shape and a mean particle diameter of 0.1 to 1.0 µm. An ultrafine metal powder as described above is mixed with a binder such as an organic resin to form a paste for forming the internal electrodes. The paste thus formed is applied onto ceramic green sheets by screen printing or the like to form thin films, followed by lamination of several hundreds of the green sheets thus processed, so that a laminate composite including internal electrode layers is formed. Subsequently, a multilayer ceramic capacitor is formed by processing the above laminate composite through a degreasing step, a sintering step, and a firing step. The mean particle diameter described above indicates a mean volume-surface diameter (d3) in terms of number-size distribution.

Concomitant with the recent trend toward miniaturization and higher capacity of multilayer ceramic capacitors, it has been required that the number of ceramic green sheets including internal electrode layers is increased from several hundreds to approximately one thousand. In order to satisfy this requirement, the thickness of the internal electrode layer is decreased from 3 µm, which has been heretofore used, to 1.5 µm or less.

In addition, when an ultrafine metal powder has poor dispersibility and includes aggregates such as clumps, the aggregates may penetrate a ceramic sheet layer to cause short circuiting of electrodes, and hence defective units are formed. Even when the aggregates do not penetrate a ceramic sheet layer, since the distance between electrodes is decreased, local current crowding occurs, thereby causing degradation and a decrease in the lifetime of a multilayer ceramic capacitor.

Accordingly, the particle size distribution D90 of an ultrafine metal powder used as a raw material for internal electrode layers is preferably decreased as much as possible. The term "particle size distribution (D90)" indicates a particle diameter at a cumulative percentage of 90% (D90) on a volume basis.

In a related production process (Process 20 shown in FIG. 2) of an ultrafine metal powder by a chemical vapor deposition (CVD) method, after residues of a metal chloride used as a raw material for the ultrafine metal powder are removed for purification of the ultrafine metal powder during Step 21, which is a wet washing step for purification, to form a metal-water slurry, the metal powder in the slurry thus obtained is dried during Step 22, and subsequently, an ultrafine metal powder product (dry powder product) is formed during Step 23.

However, during Step 22 of drying the metal powder, since aggregation inevitably occurs due to liquid bridging forces and Van der Waals' forces generated between particles of the metal powder, there is a problem in that the particles are not sufficiently dispersed in an organic solvent during Step 24.

In addition, during Step 22 of drying the metal powder, since metal hydroxides are generated on the surfaces of the particles of the ultrafine metal powder, the ultrafine metal powder cannot have sufficient wettability (lipophilic property) with an organic solvent. As a result, in dispersing the dry powder obtained during Step 23 in an organic solvent during Step 24, there is also a problem in that the particles of the ultrafine metal powder have poor wettability with an organic solvent aggregate with each other.

Hence, although several types of dispersion treatment, such as ball mill dispersion, ultrasonic dispersion, and roll mill dispersion, are performed in combination during Step 25, the particles of the ultrafine metal powder processed by drying during Step 22 are liable to aggregate with each other and have inferior dispersibility. As a result, when the dry powder processed during Step 22 is used, a paste containing approximately up to 50 percent by mass of the ultrafine metal powder is an upper limit obtained by the dispersion treatment.

In general, the dry powder obtained during Step 23 is supplied to customers. Hence, the dry powder obtained during Step 23 is dispersed in an organic solvent (dispersion treatment during Step 24) at a customer site, and subsequently, viscosity adjustment is performed during Step 27 as a final step, thereby forming a paste.

Accordingly, in order to disaggregate aggregated particles generated during Step 22 of drying the metal powder and aggregated particles generated during Step 24 of dispersing the dry powder in an organic solvent, complicated treatment such as dispersion treatment performed in combination with ball mill treatment, ultrasonic treatment, roll mill treatment, and the like during Step 25 and the filtration treatment during Step 26 must be additionally performed. As a result, large amounts of labor and time are required.

Hence, the dry ultrafine metal powder product obtained during Step 23 is required to have superior dispersibility and to contain no aggregated particles.

As a technique related to a dispersion of an ultrafine metal powder capable of satisfying the above requirements, in Japanese Unexamined Patent Application Publication No. 2003-342607, a dispersion of a nickel powder has been disclosed, that is prepared by adding an organic solvent to a dispersion containing a water disperse medium and an ultrafine nickel powder having a mean particle diameter of 1 µm or less so as to replace at least a part of the water disperse medium, and then adding a polar solvent for processing the nickel powder.

According to Japanese Unexamined Patent Application Publication No. 2003-342607, when the dispersion of the nickel powder is prepared, treatment is preferably performed using a carbonated aqueous solution, and by treating the nickel powder in a carbonated aqueous solution, hydroxides present on the surface of the nickel powder by adhesion or adsorption are removed, resulting in further improvement in dispersibility of the nickel powder. In addition, according to the above patent document, the reason for this is believed to be as follows. When hydroxides are present on the surfaces of nickel powder particles by adsorption or the like, since the particles are attracted to each other due to the hydroxyl polarity, the hydrophilic property (suspensibility) of the particles is degraded, and as a result, the nickel powder particles aggregate with each other.

In addition, in the technique disclosed in Japanese Unexamined Patent Application Publication No. 2003-342607, instead of water with an organic solvent, a method has been disclosed in which after a surfactant is added to the dispersion, followed by the addition of the organic solvent. The dispersion thus processed is held still, and the water is then separated by decantation and is further removed by heating at 50 to 150° C. In the above patent document, many types of surfactants are mentioned by way of example, and according to the above disclosed technique, replacement of the water disperse medium with the organic solvent can be easily performed by addition of the surfactant, and superior paste properties can be finally obtained. Furthermore, it has also been disclosed that, in general, a nonionic surfactant having an HLB (hydrophile-lipophile balance) value of 3 to 20 is preferably used.

In addition, as another technique which satisfies the above requirements, an ultrafine metal powder slurry having superior dispersibility was proposed (see Japanese Unexamined Patent Application Publication No. 2004-158397). The ultrafine metal powder slurry is an ultrafine metal powder slurry containing an organic solvent, a surfactant having a hydrophilic group and a lipophilic group, and more than 60 to less than 95 percent by mass of an ultrafine metal powder, in which the hydrophilic group of the surfactant described above is sulfonato group, sulfo group, sulfonyldioxyl group, polyoxyethylene group with carboxyl group, or polyoxyethylene group with phosphate group, and in which the lipophilic group is an alkyl group containing 12 or more carbon atoms or an alkylphenyl group.

In addition, according to Japanese Unexamined Patent Application Publication No. 2003-342607, since the replacement of water with an organic solvent is performed by physical operation using the difference in gravity and by operation removing water using evaporation, for example, decantation operation and drying treatment are required. Accordingly, in particular, as disclosed in Example 1 of Japanese Unexamined Patent Application Publication No. 2003-342607, drying treatment must be performed at 120° C. for 16 hours for 1 kg of a nickel powder, followed by further drying treatment at 100° C. for 48 hours; hence, reduction in labor and reduction in treatment time have been achieved in a conductive paste production process.

On the other hand, according to Japanese Unexamined Patent Application Publication No. 2004-158397, an ultrafine metal powder slurry having superior dispersibility can be provided; however, due to advanced quality requirements for conductive pastes, improvement in properties of ultrafine metal powder slurry itself (in particular, dispersibility, dry film density, and the like) has been further achieved. That is, when the dry film density is decreased, contraction of electrode films caused by firing is increased. As a result, areas of the electrode films are decreased or are partly broken off, and an ideal electric capacity may not be obtained due to a decrease in the effective electrode area (covering area). The decrease in effective electrode area may also cause a decrease in yield of the products. Recent technical developments of multilayer ceramic capacitors primarily aim at increasing the electric capacity. In order to achieve higher electric capacity, a technique of decreasing the thickness of electrode films is required. When the thickness of electrode films is decreased, the number of metal particles overlapping each other in one layer is decreased to 4 to 8 particles, which is approximately one third of the number of particles that have been used in one layer. Accordingly, by particles overlapping each other in the thickness direction of a multilayer film, an effective electrode area after firing has been ensured; however, when the thickness of electrode films is decreased, it becomes difficult to obtain the above effect. Accordingly, an increase in dry film density after coating, that is, increase in particle density must be achieved.

SUMMARY

Hence, an object of the present invention is to provide an ultrafine metal powder slurry having superior dispersibility and dry film density that can reduce labor and treatment time in a conductive paste production process and that can prevent aggregation of the ultrafine metal powder so that no aggregated particles are generated.

Accordingly, an exemplary embodiment of the present invention provides the following ultrafine metal powder slurries (1) to (4).

(1) An ultrafine metal powder slurry comprising an organic solvent, a surfactant, and an ultrafine metal powder, in which the surfactant is oleoyl sarcosine, the content of the ultrafine metal powder in the ultrafine metal powder slurry is in the range of 70 to 95 percent by mass, and the content of the surfactant is more than 0.05 to less than 2.0 parts by mass relative to 100 parts by mass of the ultrafine metal powder.

(2) In the ultrafine metal powder slurry described in the above (1), the particle size distribution D90 of the ultrafine metal powder is less than 1.2 µm, and the particle size distribution D50, which is the mean particle diameter, is in the range of 0.1 to 1.0 µm.

(3) In the ultrafine metal powder slurry described in the above (1) or (2), the ultrafine metal powder comprises at lease one of nickel (Ni), copper (Cu), silver (Ag), molybdenum (Mo), tungsten (W), cobalt (Co), and tantalum (Ta).

(4) In the ultrafine metal powder slurry described in the above (1) or (2), the ultrafine metal powder comprises a nickel alloy containing nickel and at least one of vanadium (V), niobium (Nb), molybdenum, tantalum, tungsten, zirconium (Zr), yttrium (Y), lanthanum (La), magnesium (Mg), titanium (Ti), barium (Ba), and calcium (Ca).

(5) An ultrafine metal powder slurry comprising about 70 to 95 percent by mass of an ultrafine metal powder, oleoyl sarcosine as a surfactant in an amount of more than 0.05 to less than 2.0 parts by mass relative to 100 parts by mass of the ultrafine metal powder, and an organic solvent as the balance.

In the present invention, the "particle size distribution (D90)" represents a particle diameter at a cumulative percentage of 90% (D90) on a volume basis, which is obtained in accordance with JIS R1629-1997 "Determination of particle size distribution for fine ceramic raw powders by laser diffraction method." In addition, the "mean particle diameter D50" represents a value at a cumulative percentage of 50% (D50) on a volume basis.

As described below, according to an exemplary embodiment of the present invention, an ultrafine metal powder slurry having superior dispersibility and dry film density can be provided, that includes an ultrafine metal powder at a significantly high content and that prevents aggregation of the ultrafine metal powder so that no aggregated particles are generated. In addition, this ultrafine metal powder slurry can reduce labor and a treatment time in a conductive paste production process. Furthermore, since risky operation can be avoided in which operators may breathe dusts generated from a dry powder, and working environment can be improved, safety of workers and health environment are significantly improved.

BRIEF DESCRIPTION OF THE DRAWINGS

FIG. 2 is a flowchart of a conventional process for producing an ultrafine metal powder by a chemical vapor deposition method.

DETAILED DESCRIPTION OF EMBODIMENTS

Figure 1:
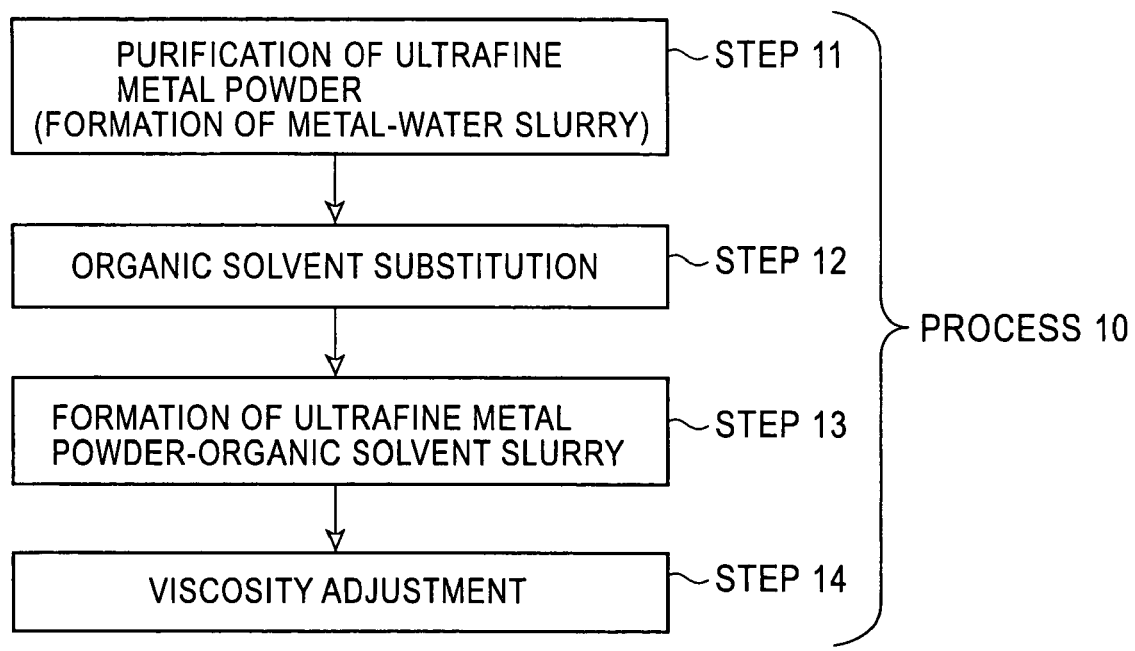
FIG. 1 is a flowchart showing an exemplary process for producing an ultrafine metal powder slurry.

In order to achieve the object described above, when an organic solvent substitution is performed by surface chemistry reaction (neutralization) using oleoyl sarcosine ($C_{17}H_{33}CON(CH_3)CH_2COOH$), which is a non-neutralized acid type surfactant, without performing pH adjustment by a carbon dioxide gas or an aqueous carbonated solution, reduction in labor and treatment time in a conductive paste production process can be achieved. Moreover, an ultrafine metal powder slurry having superior dispersibility and dry film density can be obtained in which no aggregated particles are present.

These results are based on the knowledge that since the product can be recovered as an ultrafine metal powder slurry by the surface chemical reaction (neutralization) using oleoyl sarcosine, decantation operation and drying operation are not required, and the knowledge that when removing hydroxides present on the surface of the ultrafine metal powder, oleoyl sarcosine simultaneously adsorbs thereon so as to prevent aggregation of particles of the ultrafine metal powder.

Although a general ionic surfactant is a salt type surfactant which is obtained by neutralizing an acid used as a raw material by an alkaline material, a "non-neutralized acid type" indicates that a non-neutralized acid is used as a raw material.

The exemplary ultrafine metal powder slurry contains an organic solvent, a surfactant, and an ultrafine metal powder, in which the surfactant is oleoyl sarcosine, the content of the ultrafine metal powder in the ultrafine metal powder slurry is 70 to 95 percent by mass, and the content of the surfactant relative to 100 parts by mass of the ultrafine metal powder is more than 0.05 to less than 2.0 parts by mass. In addition, it may be preferable that the particle size distribution D90 of the ultrafine metal powder be less than 1.2 µm, and that the particle size distribution D50 indicating the mean particle diameter be 0.1 to 1.0 µm.

An exemplary process for producing an ultrafine metal powder slurry of the present invention will be described below with reference to FIG. 1 by way of example. However, it is naturally to be understood that the process for producing an ultrafine metal powder slurry is not limited thereto.

FIG. 1 is a flowchart showing an exemplary process (Process 10) for producing an ultrafine metal powder slurry. Purification of an ultrafine metal powder (formation of a metal-water slurry) performed during Step 11 is similar to the purification during Step 21 of Process 20 described above, which is a process for producing an ultrafine metal powder slurry by a chemical vapor deposition method.

In Process 10, for producing an ultrafine metal powder slurry without performing a step of drying the metal powder (Step 22 shown in FIG. 2), the metal-water slurry is transferred to Step 12 of performing organic solvent substitution in which water of the ultrafine metal powder slurry is directly replaced with an organic solvent.

In particular, for example, 0.3 parts by mass of a surfactant (oleoyl sarcosine) is added relative to 100 parts by mass of the ultrafine metal powder slurry (the content of the ultrafine metal powder being 50 percent by mass), and a mixture thus formed is processed by dispersion treatment for a predetermined period of time using a process homogenizer or the like, so that aggregates of the ultrafine metal powder in water are dispersed into primary particles. Subsequently, as an organic solvent, for example, 10 parts by mass of terpineol are added relative to 100 parts by mass of the ultrafine metal powder to form a mixed solution.

Next, the mixed solution containing terpineol thus prepared is processed by mixing treatment at a temperature of 15±5° C. for a predetermined time using a process homogenizer or the like. By this mixing treatment, since terpineol is adsorbed onto oleoyl sarcosine adsorbed on the surface of the ultrafine metal powder to form a terpineol layer, and water present around the ultrafine metal powder is thus replaced with the terpineol.

When a terpineol layer containing the ultrafine metal powder forms a continuous layer, the organic solvent substitution during Step 12 is complete, and an ultrafine metal powder-terpineol slurry composed of the ultrafine metal powder, terpineol, and oleoyl sarcosine is formed into a precipitate. The water thus replaced is immediately separated as a clear supernatant (without being held still), and by this discharge of the clear supernatant, an ultrafine metal powder-terpineol slurry (ultrafine metal powder-organic solvent slurry) containing 90 percent by mass of the ultrafine metal powder is obtained during Step 13.

Because the powder is not dried, the ultrafine metal powder-organic solvent slurry obtained during Step 13 contains no aggregated particles, unlike the related technique described above. By adjusting the amount of an organic solvent used during Step 12, a slurry containing 70 to 95 percent by mass of the ultrafine metal powder can be obtained.

In addition, the ultrafine metal powder-organic solvent slurry as obtained during Step 13 can be used as a metal raw material for a conductive paste. Hence, during Step 14 in which viscosity adjustment is performed, that is, in a step of forming a conductive paste, which may be performed at a customer site, a conductive paste can be obtained by adding a binder resin (such as ethyl cellulose) solution in an amount required for viscosity adjustment to the above slurry. Accordingly, complicated, dispersion treatments, filtration treatment (Steps 25 and 26 shown in FIG. 2), and the like can be omitted. In addition, since the ultrafine metal powder-organic solvent slurry is used as a metal raw material for a conductive paste instead of the dry powder as described above, the risks caused by dust discharge from the dry powder can be avoided, and hence the working environment can be significantly improved.

The ultrafine metal powder, the surfactant, and the organic solvent forming the ultrafine metal powder slurry of the present invention are described in detail below.

(1) Type of Metal or Metal Alloy of Ultrafine Metal Powder

The exemplary ultrafine metal powder is not particularly limited to any specific metal, as long as it is a metal or an alloy having a mean particle diameter D50 of 0.1 to 1.0 µm, and particles of the metal powder preferably have an approximately spherical shape. In this exemplary embodiment, "approximately spherical shape" is defined such that the ratio of the maximum length to the minimum width of a particle, that is, the value (aspect ratio=maximum length/minimums width) obtained by dividing the maximum length by the minimum width is in the range of 1 to less than 1.8. For measurement of the aspect ratio, the aspect ratios of 500 samples observed by a scanning electron microscope are measured and are then averaged, thereby obtaining the aspect ratio.

As the type of metal or alloy described above, in particular, for example, nickel, copper, silver, molybdenum, tungsten, cobalt, and tantalum may be used alone or in combination. Among those mentioned above, nickel, copper, silver, and tantalum is preferably used because superior electrical conduction can be obtained.

In particular, for forming a conductive paste, a nickel alloy is preferably used that contains nickel and at least one metal element selected from vanadium, niobium, molybdenum, tantalum, tungsten, zirconium, yttrium, lanthanum, magnesium, titanium, barium, and calcium, in an amount of 0.03 to 10 parts by mass relative to 100 parts by mass of nickel particle. When a paste is formed using the nickel alloy described above, the heat contraction of the paste is preferably small after application thereof.

The exemplary ultrafine metal powder composed of the metal or the alloy described above can be formed by a known method such as a gas phase method or a liquid phase method. In particular, production is preferably performed by chemical vapor deposition in which, after a metal chloride is evaporated, a metal powder is obtained by reduction using $H_2$ gas. When the production is performed using chemical vapor deposition, the particle diameter of the metal powder thus produced can be easily controlled, and in addition, spherical particles can be efficiently produced.

(2) Content of Ultrafine Metal Powder: 70 to 95 Percent by Mass

The content of the exemplary ultrafine metal powder in the ultrafine metal powder slurry may be 70 to 95 percent by mass. The reason the content of the ultrafine metal powder can be significantly increased as described above is that a film of an organic solvent forms on the surface of each particle of the ultrafine metal powder. A slurry composed of an ultrafine metal powder, an organic solvent, and a surfactant is thus formed as an intermediate product in a paste production process. However, the content of the ultrafine metal powder may be approximately 50 percent by mass or less. In order to increase the dry film density, a slurry containing a larger amount of an ultrafine metal powder is preferably used. However, when a large amount thereof is contained in a slurry, even if complicated dispersion treatment is performed, it is generally difficult to disaggregate aggregates of the ultrafine metal powder in the slurry and to ensure dispersibility. When production of ceramic capacitors is performed using a slurry containing aggregates as described above as a raw metal material for conductive paste, it is difficult to obtain an appropriate performance of ceramic capacitors.

A metal slurry containing 70 to 95 percent by mass of an ultrafine metal powder and having superior dispersibility and a higher dry film density is generally difficult to obtain. However, the metal slurry described above can be realized. Without forming aggregates, substantially primary particles of an exemplary ultrafine metal powder are dispersed in an organic solvent so as to form a dense and uniform matrix.

When the content of the exemplary ultrafine metal powder is less than 70 percent by mass, since some parts between metal particles contain a larger amount of the organic solvent to form a non-uniform matrix, the dry film density is decreased. The adjustment of the content of the ultrafine metal powder is performed by adjusting the amount of the organic solvent. When the content of the ultrafine metal powder is more than 95 percent by mass, the amount of the organic solvent added thereto is insufficient and is adsorbed onto the peripheries of the particles of the ultrafine metal powder. As a result, organic solvent layer cannot be formed due to the insufficient amount thereof, so that aggregates of the ultrafine metal powder are locally formed. As a result, a non-uniform matrix is also formed in this case, and the dry film density decreases. The content of the exemplary ultrafine metal powder is more preferably in the range of more than 80 to less than 93 percent by mass.

In addition, the adjustment of the content of the ultrafine metal powder can be performed by the adjustment of the amount of an organic solvent as described below. However, when the content of the ultrafine metal powder is in the range of 70 to 95 percent by mass, the dry film density of a conductive paste obtained from the ultrafine metal powder slurry of the present invention can be increased, and in addition, the amount of an organic solvent is sufficient to form an organic solvent layer, thereby suppressing the formation of aggregates of the ultrafine metal powder.

(3) Particle Size Distribution D90 of Ultrafine Metal Powder of Less than 1.2 μm, and Mean Particle Diameter D50 of 0.1 to 1.0 μm In addition, the particle size distribution D90 of the exemplary ultrafine metal powder is preferably less than 1.2 μm and more preferably less than 1.0 μm.

As described above, of the particle size distribution of an ultrafine metal powder in an organic solvent slurry which is measured using a laser particle size analyzer, the particle size distribution D90 is a particle diameter at a cumulative percentage of 90% on a volume basis, and a laser particle size analyzer is generally used for measuring the dispersion state of metal particles dispersed in an organic solvent.

When the particle size distribution D90 of the ultrafine metal powder is less than 1.2 μm, since the dispersibility is satisfactory, and dense and smooth electrode layers are formed, a superior ceramic capacitor can be obtained. In order to decrease the number of projections of the electrode layers, D90 is more preferably less than 1.0 μm.

In addition, the mean particle diameter D50 of the ultrafine metal powder is preferably 0.1 to 1.0 μm. As for the mean particle diameter D50, in order to decrease D90, particles having a small D50 are preferably used. When metal particles having a mean particle diameter D50 of less than 1.0 μm are used, D90 can be decreased to less than 1.2 μm. Furthermore, in view of the number of projections, particles having a mean particle diameter D50 of 0.61 μm or less are preferably used. Hence, the mean particle diameter D50 is preferably 0.61 μm or less. Particles having a mean particle diameter D50 of less than 0.1 μm have high surface activity and are not practically used. However, when the surface activity of the particles can be decreased. The particles may be used to achieved the desired results discussed above.

The "particle size distribution (D90)" represents a particle diameter at a cumulative percentage of 90% (D90) on a volume basis, which is obtained in accordance with JIS R1629-1997 "Determination of particle size distribution for fine ceramic raw powders by laser diffraction method". In addition, the "mean particle diameter D50" represents a value at a cumulative percentage of 50% (D50) on a volume basis.

(4) Surfactant: Oleoyl Sarcosine, Non-Neutralized Acid Type Surfactant

A surfactant used is oleoyl sarcosine which is a non-neutralized acid type surfactant.

The properties required for a non-neutralized acid type surfactant and the reason oleoyl sarcosine is used will be described with reference to the case of an ultrafine nickel powder by way of example. In the cases of other ultrafine metal powders other than Ni, the following mechanism can also be applied thereto.

On the surface of the ultrafine Ni powder dispersed in water, there are parts on which oxide layers are present and parts on which metal Ni is present. In addition, on the surface of the ultrafine Ni powder, it has been believed that two types of hydrophilic OH groups are present due to two different formation mechanisms.

(1) OH groups formed by adsorption of water molecules on the surface of the ultrafine Ni powder, followed by releasing protons ($H^+$) (deprotonation))

(2) OH groups derived from Ni hydroxides formed by reaction between water molecules and metal ions ionized on the surface of the ultrafine Ni powder Hereinafter, the formation mechanism of the above Ni hydroxides will be described in detail. Ni ions eluted from the surface of the ultrafine Ni powder are formed into aquo-ions having water molecules as a ligand. Next, by deprotonation, hydroxyl ions are generated. Polynuclear complex ions are formed when adjacent Ni ions are bonded together with hydroxyl ions provided therebetween. The polynuclear complex ions are deprotonated and are then bonded to adjacent polynuclear complex ions, and hence the Ni hydroxides are formed on the surface of the ultrafine Ni powder. In the molecular geometry of this Ni hydroxide, a hydrophilic OH group and a water molecule are present as a ligand. It is believed that by the effect of this hydrophilic OH group and the presence of the water molecule, the affinity for water used as a disperse medium is improved. That is, it has been believed that on the surface of the ultrafine Ni powder dispersed in water, structures having superior affinity for water, that is, hydrophilic OH groups are present.

Hence, in order to replace water in the metal-water slurry with an organic solvent which is insoluble in water, the OH groups of the above (1) and (2) which are present on the surface of the ultrafine Ni powder must be removed.

Accordingly, the surfactant is required to have a function of removing OH groups from the surface of the ultrafine Ni powder by neutralizing the OH groups present thereon with protons ($H^+$) so that Ni hydroxides are dissolved in water. In addition, the surfactant is also required to be adsorbed on the surfaces of particles of the ultrafine Ni powder from which the OH groups are removed so as to function as a steric hindrance to prevent aggregation of the ultrafine Ni powder.

After the organic solvent substitution is performed, when a plurality of ultrafine metal particles having hydroxides on the surfaces thereof is present, since having no affinity for an organic solvent, the above ultrafine Ni particles aggregate with each other by a water medium (water remaining after replacement performed with an organic solvent), and as a result, the dispersibility of the slurry is degraded.

The present invention was made on the new knowledge in which as a surfactant satisfying the functions described above, a non-neutralized acid type surfactant must be used. For example, by the surfactants disclosed in Japanese Unexamined Patent Application Publication Nos. 2003-342607 and 2004-158397, which were previously discussed in Related Art, since the OH groups on the surface of the ultrafine Ni particles are not totally neutralized, and a considerable amount of water still remains after replacement performed with the organic solvent, aggregates are formed, and as a result, the dispersibility of the slurry is degraded.

In addition, the present invention was made on the new knowledge in which by particularly using oleoyl sarcosine among various non-neutralized acid type surfactants, in addition to the improvement in dispersibility of the ultrafine metal powder slurry, the dry film density can also be improved.

Besides the improvement in dispersibility of the ultrafine metal powder slurry, the reasons the dry film density can also be improved by particularly using oleoyl sarcosine among various non-neutralized acid type surfactants have not been clearly understood; however, the above phenomenon has been construed as follows.

Table 1 shows experimental data of viscosities of metal slurries prepared by using various types of non-neutralized acid type surfactants. In Experimental Example 1 in which oleoyl sarcosine was used, the viscosity of the Ni metal slurry was significantly decreased as compared to that of the other non-neutralized acid type surfactants (Experimental Examples 2 to 4). Since a low viscosity of a high concentration slurry is used as an index indicating superior dispersibility, the slurry obtained in Experimental Example 1 in which oleoyl sarcosine was used had improved dispersibility as compared to that obtained in Experimental Examples 2, 3, and 4 in which the other non-neutralized acid type surfactants were used. The reason for this is that oleoyl sarcosine is adsorbed onto the Ni metal particles so as to decrease a friction force between the metal particles. By the function described above, it is believed that metal particles are easily moved in forming a dry film, and as a result, the Ni metal particles are easily and densely compacted. The reason for this is that the adsorption mode of oleoyl sarcosine and that of the other surfactants are different from each other due to the difference in chemical difference in chemical structure therebetween. When oleoyl sarcosine of experimental example 1 is used, it is also believed that since the carbonyl group and the unpaired electron of the nitrogen atom effectively function as an adsorption site, the functional group, i.e., the $C_{17}H_{33}$ alkyl group adsorbs an organic solvent so that a uniform organic solvent film is formed on the surface of the Ni metal powder. When the slurry described above is used for a conductive paste, since ethyl cellulose added as a binder is cross-linked with the carbonyl group and the unpaired electron of the nitrogen atom of oleoyl sarcosine, and hence ethyl cellulose can also be easily dispersed around the Ni metal particles. That is, it is believed that the surfactant described above also has the function of preventing the formation of aggregates of the binder. By the effect of oleoyl sarcosine described above, the dry film density of a conductive paste is believed to be improved.

Oleoyl sarcosine used in the present invention can perform neutralization of OH groups by protons, which are present on the surface of an ultrafine metal powder in a metal-water slurry, simultaneous with chemical adsorption reaction on the surface of the ultrafine metal powder, and as a result, a monomolecular film adsorbed on the entire surface of the ultrafine metal powder is formed.

In this monomolecular film thus adsorbed, the lipophilic group ($C_{17}H_{33}$—) of oleoyl sarcosine is located outside the molecule. Accordingly, when an organic solvent molecule is adsorbed on this lipophilic group, an organic solvent layer is formed around each particle of the ultrafine metal powder. When a plurality of particles of the ultrafine metal powder wrapped in the organic solvent layers gather together and exceed a critical point at which a continuous film can be sufficiently formed with the organic solvent layers, an ultrafine metal powder slurry of the organic solvent (ultrafine metal powder-organic solvent slurry) is formed.

Since having a specific density of 5 to 6 $g/cm^3$, which is much larger than that of water, this ultrafine metal powder-organic solvent slurry precipitates and is then recovered as a reaction product.

In addition, water molecules adsorbed on the ultrafine metal powder are removed when the organic solvent molecules are adsorbed thereon, and the continuous layer is formed around the ultrafine metal powder by the organic solvent. The ability of removing water molecules effectively works when a lipophilic group of a surfactant has low affinity for a water molecule and has high affinity for an organic solvent molecule. Hence, oleoyl sarcosine, which has a ($C_{17}H_{33}$—) group as a lipophilic group, is very useful since having high ability of removing water molecules and being capable of effectively removing water molecules adsorbed on an ultrafine metal powder.

As described above, since having a lipophilic group, oleoyl sarcosine has the function of forming an organic solvent layer around an ultrafine metal powder. By the function described above, since particles of the ultrafine metal powder are each wrapped in an organic solvent, organic solvent substitution can be performed in which an ultrafine metal powder in a metal-water slurry can be transferred in an organic solvent. In addition, since having affinity for a different organic solvent which is additionally used when a paste is formed, oleoyl sarcosine can uniformly distribute an ultrafine metal powder in the paste, and as a result, the dry film density of a conductive paste can be increased.

In a conductive paste formed in accordance with Japanese Unexamined Patent Application Publication No. 2004-158397, the dry film density could be increased only up to 5.6 g/cm$^3$ when an ultrafine Ni powder having a mean particle diameter of 0.4 μm was used; however, in particular, as also shown in examples described later, in a conductive paste formed from a slurry containing oleoyl sarcosine as a surfactant in accordance with the present invention, the dry film density can be increased to 5.8 g/cm$^3$ or more.

In addition to the effect of a lipophilic ($C_{17}H_{33}$—) group dispersing an ultrafine metal powder in an organic solvent, the reason the dense film is formed as described above is that a carbonyl group (C=O) and an unpaired electron are bonded with ethyl cellulose used in forming a conductive paste by acid-base reaction.

(5) Content of Oleoyl Sarcosine: More than 0.05 to Less than 2.0 Parts by Mass Relative to 100 Parts by Mass of the Ultrafine Metal Powder The content of the surfactant (oleoyl sarcosine) which is uniformly adsorbed on the entire surface of an ultrafine metal powder in a metal-water slurry is an appropriate amount, and the content of oleoyl sarcosine is in the range of more than 0.05 to less than 2.0 parts by mass relative to 100 parts by mass of the ultrafine metal powder. When the content of oleoyl sarcosine is 0.05 parts by mass or less relative to 100 parts by mass of the ultrafine metal powder, oleoyl sarcosine is not sufficiently adsorbed on the entire surface of the ultrafine metal powder, and the organic solvent substitution cannot be satisfactorily performed; hence, the content is preferably more than 0.05 parts by mass. On the other hand, when the content of oleoyl sarcosine is 2.0 parts by mass or more relative to 100 parts by mass of the ultrafine metal powder, since the content of oleoyl sarcosine exceeds the amount which is uniformly adsorbed on the entire surface of the ultrafine metal powder, the excessive amount of oleoyl sarcosine has little effect and is not economical; hence, the content is preferably set to less than 2.0 parts by mass. When the content of oleoyl sarcosine is in the range of more than 0.05 to less than 2.0 parts by mass, the surfactant is sufficiently adsorbed on the entire surface of the ultrafine metal powder, and a monomolecular layer adsorbed thereon can be formed. Accordingly, preferably, the organic solvent substitution can be easily performed, the dry film density obtained from a conductive paste is increased, and economical advantages can also be obtained.

(6) Organic Solvent

The content of the organic solvent used in the present invention is the balance obtained by deducting the total of the ultrafine metal powder and the surfactant from the ultrafine metal powder slurry, which are defined in the present invention. Although any organic solvent may be used as long as it is generally used as a solvent for a conductive paste, for example, terpene alcohol solvents and aliphatic hydrocarbon solvents may be preferably mentioned. As the terpene alcohols, for example, terpineol, dihydroterpineol, terpineol acetate, borneol, geraniol, and linalool may be mentioned and may be used alone or in combination.

As the aliphatic hydrocarbon alcohols, n-decane, n-dodecane, and mineral spirit may be mentioned by way of example and may be used alone or in combination.

In the present invention, since being determined by the content of the ultrafine metal powder and the content of oleoyl sarcosine described above, the content of the organic solvent described above is approximately 3.1 to 30 percent by mass (approximately 3.2 to 42 parts by mass relative to 100 parts by mass of the ultrafine metal powder).

The ultrafine metal powder slurry of the present invention can be preferably used as a raw material for a conductive paste due to the various properties described above and can be used as conductive paste fillers or internal electrodes of multilayer ceramic capacitors.

EXAMPLES

Hereinafter, the present invention will be described with reference to examples; however, it is to be naturally understood that the present invention is not limited thereto.

Example 1

First, 10 liters of an ultrafine Ni powder-water slurry (content of ultrafine Ni powder of 50 percent by mass) were prepared, the ultrafine Ni powder having a high purity and a mean particle diameter of 0.4 μm. This slurry corresponds to the slurry obtained by the purification of ultrafine metal powder during Step 11 shown in FIG. 1.

Next, 0.3 parts by mass of oleoyl sarcosine (Sarcosinate OH manufactured by Nikko Chemical Co., Ltd.) used as a surfactant was added relative to 100 parts by mass of this ultrafine Ni powder slurry. Subsequently, at a temperature of 15° C.±5° C., pretreatment was performed at a blade rotation speed of 800 rotations per minute (rpm) for 30 minutes by a dispersion device using a process homogenizer (manufactured by SMT Co., Ltd).

Next, to the ultrafine Ni powder-water slurry thus pretreated, 10 parts by mass of terpineol (manufactured by Yasuhara Chemical Co., Ltd.) used as an organic solvent relative to 100 parts by mass of the ultrafine Ni powder was added to form a mixture. The mixture thus formed was processed at a temperature of 15° C.±5° C. by a dispersion device using a process homogenizer (manufactured by SMT Co., Ltd.) at a blade rotation speed of 5,000 rpm for 15 minutes. Accordingly, water present around the ultrafine Ni powder was replaced with terpineol, and as a result, an ultrafine Ni powder-terpineol slurry was obtained as a precipitate in water.

Subsequently, a separated clear supernatant was discharged, and an ultrafine Ni powder-terpineol slurry (Ni-organic solvent slurry) containing 90 percent by mass of the ultrafine Ni powder was obtained, the slurry being composed of the ultrafine Ni powder, terpineol, and oleoyl sarcosine.

Solvent Substitution

Solvent substitution of the ultrafine Ni powder-terpineol slurry thus formed was evaluated based on the following criteria. That is, substitution totally performed was evaluated as "Good" by ○, substitution partly performed (powdered Ni floating in a supernatant) was evaluated as "Fair" by Δ, and substitution insufficiently performed (no formation of ultrafine Ni powder-terpineol slurry) was evaluated as "Poor" by x. The results are shown in Table 2 below.

In addition, the water content of the ultrafine Ni powder-organic solvent slurry after the solvent substitution was measured using a Karl Fisher moisture meter. When the amount of remaining water is smaller, it indicates that more superior solvent substitution is obtained. Furthermore, it also indicates that the generation of Ni powder aggregates caused by water remaining in the organic solvent is significantly suppressed. The results are shown in Table 2 below.

Measurement of Particle Size Distribution

The particle size distribution of the ultrafine Ni powder-terpineol slurry thus obtained was measured using a laser particle size analyzer under the following conditions. In this measurement, after a solution processed by pre-dispersion treatment was charged into the analyzer until a predetermined absorbance was obtained, the measurement was performed.

Measurement device: Laser particle size analyzer (SALD-2100 manufactured by Shimadzu Corporation)

Refractive index: 1.60

Sample mass: 30.00 to 36.00 mg

Dispersion solution: 100 ml of terpineol

Pre-dispersion treatment: ultrasonic homogenizer (US-600 manufactured by Nippon Seiki Seisakusho Co., Ltd).

Pre-dispersion time: 5 minutes

The dispersibility was evaluated by the particle size distribution D90 based on the following criteria. That is, a D90 of less than 1.2 μm was evaluated as "Good" by ○, a D90 of 1.2 μm to less than 1.5 μm was evaluated as "Fair" by Δ, and a D90 of 1.5 μm to less than 2.0 μm was evaluated as "Poor" by x. The results are shown in Table 2 below.

Measurement of Dry Film Density ($\rho G$: g/cm$^3$)

To 111 parts by mass of the obtained ultrafine Ni powder-terpineol slurry (content of the ultrafine Ni powder of 90 percent by mass), 62.5 parts by mass of a binder resin solution was added in which 8 percent by mass of ethyl cellulose was contained in terpineol, and after the mixture thus formed was mixed by an agitator for 30 minutes, terpineol was added thereto for viscosity adjustment so that the content of the ultrafine Ni powder was approximately 50 percent by mass, thereby forming a conductive paste.

The conductive paste thus prepared was applied by an applicator onto a PET (polyethylene terephthalate) film processed beforehand by release treatment so as to obtain a smooth coating surface. After the PET film provided with the conductive paste by application was dried by a hot plate which was set at a temperature of 80 to 150° C., the conductive paste was peeled away from the PET film, thereby forming a dry film. By using a cylindrical punching tool, a circular film having a diameter of 2 cm was obtained from the dry film thus formed.

From the mass and the volume of the circular film thus obtained, the dry film density was calculated. As for the volume, the thickness was measured at several points (approximately 5 to 6 points) using a micrometer, and the average thereof was obtained therefrom. The results are shown in Table 2 below. A dry film having a density of 5.8 g/cm$^3$ or more was regarded as a dense film in the present invention.

Example 2

An ultrafine Ni powder-terpineol slurry was obtained in the same manner as that in Example 1 except that 0.1 parts by mass of oleoyl sarcosine (Sarcosinate OH manufactured by Nikko Chemical Co., Ltd.) was added relative to 100 parts by mass of the ultrafine Ni powder.

Example 3

An ultrafine Ni powder-terpineol slurry was obtained in the same manner as that in Example 1 except that 1.0 part by mass of oleoyl sarcosine (Sarcosinate OH manufactured by Nikko Chemical Co., Ltd.) was added relative to 100 parts by mass of the ultrafine Ni powder.

Example 4

An ultrafine Ni powder-terpineol slurry was obtained in the same manner as that in Example 1 except that 2.0 parts by mass of oleoyl sarcosine (Sarcosinate OH manufactured by Nikko Chemical Co., Ltd.) was added relative to 100 parts by mass of the ultrafine Ni powder.

Example 5

An ultrafine Ni powder-terpineol slurry (content of the ultrafine Ni powder of 80 percent by mass) was obtained in the same manner as that in Example 1 except that 25 parts by mass of terpineol was added relative to 100 parts by mass of the ultrafine Ni powder.

Example 6

An ultrafine Ni powder-terpineol slurry (content of the ultrafine Ni powder of 95 percent by mass) was obtained in the same manner as that in Example 1 except that 5.3 parts by mass of terpineol was added relative to 100 parts by mass of the ultrafine Ni powder.

Example 7

An ultrafine Ni powder-terpineol slurry (content of the ultrafine Ni powder of 70 percent by mass) was obtained in the same manner as that in Example 1 except that 42 parts by mass of terpineol was added relative to 100 parts by mass of the ultrafine Ni powder.

Example 8

An ultrafine Ni powder-dodecane slurry was obtained in the same manner as that in Example 1 except that n-dodecane (n-$C_{12}H_{26}$), an aliphatic hydrocarbon, was used as the organic solvent.

Example 9

An ultrafine Ni powder-dihydroterpineol slurry was obtained in the same manner as that in Example 1 except that dihydroterpineol was used as the organic solvent.

Example 10

An ultrafine Ni powder-terpineol acetate slurry was obtained in the same manner as that in Example 1 except that terpineol acetate was used as the organic solvent.

Example 11

An ultrafine Cu powder-terpineol slurry was obtained in the same manner as that in Example 1 except that an ultrafine Cu powder having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine Cu powder.

Example 12

An ultrafine Ag powder-terpineol slurry was obtained in the same manner as that in Example 1 except that an ultrafine Ag powder having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine Ag powder.

Example 13

An ultrafine Mo powder-terpineol slurry was obtained in the same manner as that in Example 1 except that an ultrafine Mo powder having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine Mo powder.

Example 14

An ultrafine W powder-terpineol slurry was obtained in the same manner as that in Example 1 except that an ultrafine W powder having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine W powder.

Example 15

An ultrafine Co powder-terpineol slurry was obtained in the same manner as that in Example 1 except that an ultrafine Co powder having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine Co powder.

Example 16

An ultrafine Ta powder-terpineol slurry was obtained in the same manner as that in Example 1 except that an ultrafine Ta powder having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine Ta powder.

Example 17

An ultrafine Ni—V alloy powder-terpineol slurry was obtained in the same manner as that in Example 1 except that a nickel-vanadium alloy powder (Ni:V=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-vanadium alloy powder.

Example 18

An ultrafine Ni—Cr alloy powder-terpineol slurry was obtained in the same manner as that in Example 1 except that a nickel-chromium alloy powder (Ni:Cr=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-chromium alloy powder.

Example 19

An ultrafine Ni—Nb alloy powder-terpineol slurry was obtained in the same manner as that in Example 1 except that a nickel-niobium alloy powder (Ni:Nb=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-niobium alloy powder.

Example 20

An ultrafine Ni—Mo alloy powder-terpineol slurry was obtained in the same manner as that in Example 1 except that a nickel-molybdenum alloy powder (Ni:Mo=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-molybdenum alloy powder.

Example 21

An ultrafine Ni—Ta alloy powder-terpineol slurry was obtained in the same manner as that in Example 1 except that a nickel-tantalum alloy powder (Ni:Ta=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-tantalum alloy powder.

Example 22

An ultrafine Ni—W alloy powder-terpineol slurry was obtained in the same manner as that in Example 1 except that a nickel-tungsten alloy powder (Ni:W=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-tungsten alloy powder.

Example 23

An ultrafine Ni—Zr alloy powder-terpineol slurry was obtained in the same manner as that in Example 1 except that a nickel-zirconium alloy powder (Ni:Zr=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-zirconium alloy powder.

Example 24

An ultrafine Ni—Y alloy powder-terpineol slurry was obtained in the same manner as that in Example 1 except that a nickel-yttrium alloy powder (Ni:Y=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-yttrium alloy powder.

Example 25

An ultrafine Ni—La alloy powder-terpineol slurry was obtained in the same manner as that in Example 1 except that a nickel-lanthanum alloy powder (Ni:La=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-lanthanum alloy powder.

Example 26

An ultrafine Ni—Mg alloy powder-terpineol slurry was obtained in the same manner as that in Example 1 except that a nickel-magnesium alloy powder (Ni:Mg=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-magnesium alloy powder.

Example 27

An ultrafine Ni—Ti alloy powder-terpineol slurry was obtained in the same manner as that in Example 1 except that a nickel-titanium alloy powder (Ni:Ti=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-titanium alloy powder.

Example 28

An ultrafine Ni—Ba alloy powder-terpineol slurry was obtained in the same manner as that in Example 1 except that a nickel-barium alloy powder (Ni:Ba=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-barium alloy powder.

Example 29

An ultrafine Ni—Ca alloy powder-terpineol slurry was obtained in the same manner as that in Example 1 except that a nickel-calcium alloy powder (Ni:Ca=95:5) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-calcium alloy powder.

Example 30

An ultrafine Ni—W—Ca alloy powder-terpineol slurry was obtained in the same manner as that in Example 1 except that a nickel-tungsten-calcium alloy powder (Ni:W:Ca=95:3:2) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-tungsten-calcium alloy powder.

Example 31

An ultrafine Ni—Mg—Zr alloy powder-terpineol slurry was obtained in the same manner as that in Example 1 except that a nickel-magnesium-zirconium alloy powder (Ni:Mg:Zr=95:3:2) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-magnesium-zirconium alloy powder.

Example 32

An ultrafine Ni—Mo—Mn alloy powder-terpineol slurry was obtained in the same manner as that in Example 1 except that a nickel-molybdenum-manganese alloy powder (Ni:Mo:Mn=95:3:2) having a mean particle diameter of 0.4 μm was used as the ultrafine metal powder, and that 0.3 parts by mass of oleoyl sarcosine (Sarcosinate OH manufactured by Nikko Chemical Co., Ltd.) was added relative to 100 parts by mass of the ultrafine nickel-molybdenum-manganese alloy powder.

Example 35

A conductive paste was obtained in the same manner as that in Example 1 of the present invention except that 0.06 parts by mass of oleoyl sarcosine was used as the surfactant.

Comparative Example 1

An ultrafine Ni powder-terpineol slurry was formed through the same steps as Steps 21, 22, 23, and 24 of Process 20 in FIG. 2 for forming an intermediate paste by the related chemical vapor deposition (CVD) method.

In particular, to 1,000 g of a highly pure ultrafine Ni powder (dry powder) formed by a CVD method having a mean particle diameter of 0.4 μm, terpineol (manufactured by Yasuhara Chemical Co., Ltd.) was added at a ratio of 1 to 1 on a mass basis, so that content of the ultrafine Ni powder was set to 50 percent by mass.

Next, 0.5 parts by mass of oleoyl sarcosine (Sarcosinate OH manufactured by Nikko Chemical Co., Ltd.) was added relative to 100 parts by mass of the ultrafine Ni powder. Subsequently, dispersion treatment was performed for 1 hour by a cake mixer, thereby forming an ultrafine Ni powder-terpineol slurry.

Comparative Example 2

An ultrafine Ni powder-terpineol slurry (content of ultrafine Ni powder of 97 percent by mass) was obtained in the same manner as that in Comparative Example 1 except that 3 parts by mass of terpineol (manufactured by Yasuhara Chemical Co., Ltd.) was added relative to 100 parts by mass of the ultrafine Ni powder.

Comparative Example 3

An ultrafine Ni powder-terpineol slurry (content of ultrafine Ni powder of 90 percent by mass) was obtained in the same manner as that in Comparative Example 1 except that 0.01 parts by mass of oleoyl sarcosine (Sarcosinate OH manufactured by Nikko Chemical Co., Ltd.) was added relative to 100 parts by mass of the ultrafine Ni powder.

Comparative Example 4

An ultrafine Ni powder-terpineol slurry (content of ultrafine Ni powder of 90 percent by mass) was obtained in the same manner as that in Comparative Example 1 except that 0.04 parts by mass of oleoyl sarcosine (Sarcosinate OH manufactured by Nikko Chemical Co., Ltd.) was added relative to 100 parts by mass of the ultrafine Ni powder.

Comparative Example 5

An ultrafine Ni powder-terpineol slurry was obtained in the same manner as that in Example 1 except that carboxylated polyoxyethylene alkyl ether (ECT-7 manufactured by Nikko Chemical Co., Ltd.) was used as the surfactant.

Comparative Example 6

An ultrafine Ni powder-terpineol slurry was obtained in the same manner as that in Example 1 except that polyoxyethylene lauryl ether acetate (RLM-45 manufactured by Nikko Chemical Co., Ltd.) was used as the surfactant.

Comparative Example 7

An ultrafine Ni powder-terpineol slurry was obtained in the same manner as that in Example 1 except that alkylbenzenesulfonic acid (Lipon LH-200 manufactured by Lion Corporation) was used as the surfactant, and that 0.2 parts by mass thereof was added relative to 100 parts by mass of the ultrafine Ni powder.

Comparative Example 8

An ultrafine Ni powder-terpineol slurry was obtained in the same manner as that in Example 1 except that polyoxyethylene alkyl ether (Emulgen 707 manufactured by Kao Corporation) was used as the surfactant.

Comparative Example 9

An ultrafine Ni powder-terpineol slurry was obtained in the same manner as that in Example 1 except that sorbitan aliphatic acid ester (Rheodol SP-030 manufactured by Kao Corporation) was used as the surfactant.

For the slurries thus obtained in Examples 2 to 32, and 35 and Comparative Examples 1 to 9, by the same methods as those in Example 1, the solvent substitution, water content, dispersibility (particle size distribution (D90)), and dry film density were measured for evaluation. The results are shown in Table 2.

From the results shown in Table 2, compared to the ultrafine metal powder slurries obtained in Comparative Examples 1 to 9, the ultrafine metal powder slurries obtained in Examples 1 to 32, and 35 are superior in terms of the solvent substitution and the dispersibility and are also superior in terms of the dry film density of the conductive paste.

Next, in order to confirm the dispersibility as a conductive paste and the reduction in labor in a process for forming a conductive paste, conductive pastes were formed from the ultrafine metal powder slurries obtained in accordance whit the present invention.

Example 33

First, 10 parts by mass of a binder resin solution of terpineol containing 12 percent by mass of ethyl cellulose was added to 100 parts by mass of the ultrafine Ni powder-terpineol slurry obtained in Example 1, followed by mixing for 30 minutes by an agitator. Subsequently, viscosity adjustment was performed so that the content of the ultrafine Ni powder was approximately 80 percent by mass, thereby forming a conductive paste.

Example 34

A conductive paste was obtained in the same manner as that in Example 1 except that the ultrafine Cu powder-terpineol slurry obtained in Example 11 was used.

Comparative Example 10

After 10 parts by mass of a binder resin solution of terpineol containing 12 percent by mass of ethyl cellulose was added to 100 parts by mass of the ultrafine Ni powder-terpineol slurry obtained in Comparative Example 1, the mixture thus obtained was then agitated for 1 hour by an agitator and was then allowed to pass through a three-roll mill five times, followed by filtration treatment using a cartridge filter type pressure filtration device. Subsequently, viscosity adjustment was performed so that the content of the ultrafine Ni powder was an approximately 45 percent by mass, thereby forming a conductive paste.

For evaluation of the dispersibility of the conductive pastes obtained in Examples 33 and 34 and comparative Example 10, the conductive paste thus formed was screen-printed by hand onto a glass substrate to have a thickness of 1 to 2 μm and was then dried in a drying furnace, and subsequently, the number of projections generated on the surface of the film was measured by visual inspection.

Evaluation was performed by the number of projections present in an area of 1 cm by 1 cm, and a film having a smaller number of projections was regarded as superior. The compositions of the conductive pastes obtained as described above and the results of the dispersion evaluation are shown in Table 3 below.

From the results shown in Table 3, it is understood that the conductive pastes of Examples 33 and 34 are significantly superior to the conductive paste of Comparative Example 10 in terms of dispersibility since even when the content of the ultrafine metal powder is increased, the number of projections is remarkably small. Accordingly, it is also understood that reduction in labor in the process can also be realized.

Next, the relationship between the mean particle size D50 and the dispersibility of an ultrafine metal powder was investigated, the dispersibility including D90 and the number of projections on the dry film surface.

Examples 40 to 48

Ultrafine Ni powder-terpineol slurries were formed in the same manner as that in Example 1 except that ultrafine Ni powders having various mean particle diameters D50 from 0.13 to 1.15 μm were used as the ultrafine metal powder, and that 0.3 parts by mass of oleoyl sarcosine (Sarcosinate OH manufactured by Nikko Chemical Co., Ltd.) was added relative to 100 parts by mass of the ultrafine Ni powder.

As the evaluation other than D90, the ultrafine Ni powder-terpineol slurry thus formed was applied using an applicator onto a glass substrate to have a thickness of 1 to 2 μm and was then dried in a drying furnace, and subsequently, the number of projections generated on the surface of the film thus dried was measured. Evaluation was performed by the number of projections present in an area of 1 cm by 1 cm, and a film having a smaller number of projections was regarded as superior.

Evaluation Criteria of Dispersibility

The number of projections:
  more than 10 . . . x (Poor)
  5 to less than 10 . . . Δ (Fair)
  less than 5 . . . ○ (Good)

When the mean particle diameter D50 was in the range of 0.13 to 0.96 μm, the dispersibility D90 was particularly superior, such as less than 1.2 μm. In addition, when the mean particle diameter D50 was in the range of 0.61 to 0.96 μm, the number of projections was decreased to 4 or less, and the dispersibility was further improved.

TABLE 1

|  | EXPERIMENTAL EXAMPLE 1 | EXPERIMENTAL EXAMPLE 2 | EXPERIMENTAL EXAMPLE 3 | EXPERIMENTAL EXAMPLE 4 |
|---|---|---|---|---|
| TYPE OF SURFACTANT | OLEOYL SARCOSINE | CARBOXYLATED POLYOXYETHYLENE ALKYL ETHER | POLYOXYETHYLENE LAURYL ETHER ACETATE | ALKYLBENZENE-SULFONIC ACID |
| TYPE OF ULTRAFINE METAL POWDER | Ni | | | |
| MEAN PARTICLE DIAMETER OF ULTRAFINE METAL POWDER | 0.4 μm | | | |
| CONTENT OF ULTRAFINE METAL POWDER (MASS %) | 90 | | | |
| CONTENT OF ULTRAFINE METAL POWDER (VOLUME %) | 50 | | | |
| TYPE OF ORGANIC SOLVENT | TERPINEOL | | | |
| VISCOSITY OF ORGANIC SOLVENT (cp, 20° C.) | 54 | | | |
| VISCOSITY OF METAL SLURRY (cps) (STRAIN RATE: 1.1 sec$^{-1}$, 10 rpm) | 18000 | 30000 | 30000 | 30000 |
| SOLVENT SUBSTITUTION | ○ good | ○ good | ○ good | ○ good |
| WATER CONTENT (MASS %) | 0.2 | 0.2 | 0.2 | 0.2 |
| DISPERSIBILITY | ○ good | ○ good | ○ good | ○ good |
| DRY FILM DENSITY (g/cm$^3$) | 5.9 | 5.6 | 5.6 | 5.6 |
| REMARKS | EXAMPLE 1 | COMPARATIVE EXAMPLE 5 | COMPARATIVE EXAMPLE 6 | COMPARATIVE EXAMPLE 7 |

TABLE 2

|  | TYPE OF METAL | TYPE OF ORGANIC SOLVENT | TYPE OF SURFACTANT | CONTENT OF SURFACTANT (PARTS BY MASS) | CONTENT OF ULTRAFINE METAL POWDER (MASS %) |
|---|---|---|---|---|---|
| EXAMPLE 1 | Ni | TERPINEOL | OLEOYL SARCOSINE | 0.3 | 90 |
| EXAMPLE 2 | Ni | | | 0.1 | 90 |
| EXAMPLE 3 | Ni | | | 1.0 | 90 |
| EXAMPLE 4 | Ni | | | 1.9 | 90 |
| EXAMPLE 5 | Ni | | | 0.3 | 80 |
| EXAMPLE 6 | Ni | | | 0.3 | 95 |
| EXAMPLE 7 | Ni | | | 0.3 | 70 |
| EXAMPLE 8 | Ni | n-DODECAN | | 0.3 | 90 |
| EXAMPLE 9 | Ni | DIHYDROTERPINEOL | | 0.3 | 90 |
| EXAMPLE 10 | Ni | TERPINEOLACETATE | | 0.3 | 90 |
| EXAMPLE 11 | Cu | TERPINEOL | | 0.3 | 90 |
| EXAMPLE 12 | Ag | | | 0.3 | 90 |
| EXAMPLE 13 | Mo | | | 0.3 | 90 |
| EXAMPLE 14 | W | | | 0.3 | 90 |
| EXAMPLE 15 | Co | | | 0.3 | 90 |
| EXAMPLE 16 | Ta | | | 0.3 | 90 |
| EXAMPLE 17 | Ni—V | TERPINEOL | OLEOYL SARCOSINE | 0.3 | 90 |
| EXAMPLE 18 | Ni—Cr | | | 0.3 | 90 |
| EXAMPLE 19 | Ni—Nb | | | 0.3 | 90 |
| EXAMPLE 20 | Ni—Mo | | | 0.3 | 90 |
| EXAMPLE 21 | Ni—Ta | | | 0.3 | 80 |
| EXAMPLE 22 | Ni—W | | | 0.3 | 95 |
| EXAMPLE 23 | Ni—Zr | | | 0.3 | 70 |
| EXAMPLE 24 | Ni—Y | | | 0.3 | 90 |
| EXAMPLE 25 | Ni—La | | | 0.3 | 90 |
| EXAMPLE 26 | Ni—Mg | | | 0.3 | 90 |
| EXAMPLE 27 | Ni—Ti | | | 0.3 | 90 |
| EXAMPLE 28 | Ni—Ba | | | 0.3 | 90 |
| EXAMPLE 29 | Ni—Ca | | | 0.3 | 90 |

TABLE 2-continued

| | | | | | |
|---|---|---|---|---|---|
| EXAMPLE 30 | Ni—W—Ca | | | 0.3 | 90 |
| EXAMPLE 31 | Ni—Mg—Zr | | | 0.3 | 90 |
| EXAMPLE 32 | Ni—Mo—Mn | | | 0.3 | 90 |
| EXAMPLE 35 | Ni | | | 0.06 | 90 |
| COMPARATIVE EXAMPLE 1 | Ni | TERPINEOL | OLEOYL SARCOSINE | 0.5 | 50 |
| COMPARATIVE EXAMPLE 2 | Ni | | OLEOYL SARCOSINE | 0.5 | 97 |
| COMPARATIVE EXAMPLE 3 | Ni | | OLEOYL SARCOSINE | 0.04 | 90 |
| COMPARATIVE EXAMPLE 4 | Ni | | OLEOYL SARCOSINE | 0.01 | 90 |
| COMPARATIVE EXAMPLE 5 | Ni | | CARBOXYLATED POLYOXYETHYLENE ALKYL ETHER | 0.3 | 90 |
| COMPARATIVE EXAMPLE 6 | Ni | | POLYOXYETHYLENE LAURYL ETHER ACETATE | 0.3 | 90 |
| COMPARATIVE EXAMPLE 7 | Ni | | ALKYLBENZENESULFONIC ACID | 0.3 | 90 |
| COMPARATIVE EXAMPLE 8 | Ni | | POLYOXYETHYLENE ALKYL ETHER | 0.5 | 90 |
| COMPARATIVE EXAMPLE 9 | Ni | | SORBITAN FATTY ACID ESTER | 0.5 | 90 |

| | SOLVENT SUBSTITUTION | WATER CONTENT (MASS %) | DISPERSIBILITY | DRY FILM DENSITY (g/cm³) |
|---|---|---|---|---|
| EXAMPLE 1 | ○ good | 0.2 | ○ good | 5.9 |
| EXAMPLE 2 | ○ good | 0.2 | ○ good | 5.8 |
| EXAMPLE 3 | ○ good | 0.2 | ○ good | 5.9 |
| EXAMPLE 4 | ○ good | 0.2 | ○ good | 5.9 |
| EXAMPLE 5 | ○ good | 0.2 | ○ good | 5.8 |
| EXAMPLE 6 | ○ good | 0.2 | ○ good | 5.8 |
| EXAMPLE 7 | ○ good | 0.2 | ○ good | 5.8 |
| EXAMPLE 8 | ○ good | 0.2 | ○ good | 5.9 |
| EXAMPLE 9 | ○ good | 0.2 | ○ good | 5.9 |
| EXAMPLE 10 | ○ good | 0.2 | ○ good | 5.9 |
| EXAMPLE 11 | ○ good | 0.2 | ○ good | 5.9 |
| EXAMPLE 12 | ○ good | 0.2 | ○ good | 5.9 |
| EXAMPLE 13 | ○ good | 0.2 | ○ good | 5.9 |
| EXAMPLE 14 | ○ good | 0.2 | ○ good | 5.9 |
| EXAMPLE 15 | ○ good | 0.2 | ○ good | 5.9 |
| EXAMPLE 16 | ○ good | 0.2 | ○ good | 5.9 |
| EXAMPLE 17 | ○ good | 0.2 | ○ good | 5.9 |
| EXAMPLE 18 | ○ good | 0.2 | ○ good | 5.9 |
| EXAMPLE 19 | ○ good | 0.2 | ○ good | 5.9 |
| EXAMPLE 20 | ○ good | 0.2 | ○ good | 5.9 |
| EXAMPLE 21 | ○ good | 0.2 | ○ good | 5.9 |
| EXAMPLE 22 | ○ good | 0.2 | ○ good | 5.9 |
| EXAMPLE 23 | ○ good | 0.2 | ○ good | 5.9 |
| EXAMPLE 24 | ○ good | 0.2 | ○ good | 5.9 |
| EXAMPLE 25 | ○ good | 0.2 | ○ good | 5.9 |
| EXAMPLE 26 | ○ good | 0.2 | ○ good | 5.9 |
| EXAMPLE 27 | ○ good | 0.2 | ○ good | 5.9 |
| EXAMPLE 28 | ○ good | 0.2 | ○ good | 5.9 |
| EXAMPLE 29 | ○ good | 0.2 | ○ good | 5.9 |
| EXAMPLE 30 | ○ good | 0.2 | ○ good | 5.9 |
| EXAMPLE 31 | ○ good | 0.2 | ○ good | 5.9 |
| EXAMPLE 32 | ○ good | 0.2 | ○ good | 5.9 |
| EXAMPLE 35 | ○ good | 0.2 | ○ good | 5.8 |
| COMPARATIVE EXAMPLE 1 | ○ good | 0.2 | x bad | 5.3 |
| COMPARATIVE EXAMPLE 2 | Δ fair | 0.8 | x bad | 5.4 |
| COMPARATIVE EXAMPLE 3 | Δ fair | 2 | x bad | 5.5 |
| COMPARATIVE EXAMPLE 4 | Δ fair | 1.2 | x bad | 5.5 |
| COMPARATIVE EXAMPLE 5 | ○ good | 0.2 | ○ good | 5.6 |
| COMPARATIVE EXAMPLE 6 | ○ good | 0.2 | ○ good | 5.6 |
| COMPARATIVE EXAMPLE 7 | ○ good | 0.2 | ○ good | 5.6 |
| COMPARATIVE EXAMPLE 8 | x bad | 50 | x bad | NO MEASUREMENT |
| COMPARATIVE EXAMPLE 9 | x bad | 50 | x bad | NO MEASUREMENT |

TABLE 3

|  | EXAMPLE 33 | EXAMPLE 34 | COMPARATIVE EXAMPLE 10 |
|---|---|---|---|
| TYPE OF ULTRAFINE METAL POWDER | Ni | Cu | Ni |
| CONTENT OF ULTRAFINE METAL POWDER (MASS %) | 81.6 | 81.6 | 45.6 |
| ORGANIC SOLVENT (TERPINEOL) (MASS %) | 17 | 17 | 53 |
| CONTENT OF BINDER RESIN (ETHYL CELLULOSE) (MASS %) | 1.1 | 1.1 | 1 |
| CONTENT OF SURFACTANT (PARTS BY MASS) | 0.3 | 0.3 | 0.5 |
| DISPERSIBILITY (NUMBER OF PROJECTIONS) | 1 | 1 | 20 |

TABLE 4

|  | TYPE OF METAL | MEAN PARTICLE DIAMETER/μm | CONTENT OF SUR-FACTANT (PARTS BY MASS) | CONTENT OF Ni (MASS %) | SOLVENT SUBSTITUTION | DISPERSIBILITY D90 (MEASURED VALUE) | NUMBER OF PROJECTIONS | WATER CONTENT (MASS %) | DRY FILM DENSITY (g/cm$^3$) |
|---|---|---|---|---|---|---|---|---|---|
| EXAMPLE 40 | Ni | 0.13 | 0.3 | 90 | ○ | ○ good (0.88) | ○ good (1) | 0.2 | 5.8 |
| EXAMPLE 41 | Ni | 0.19 | 0.3 | 90 | ○ | ○ good (0.78) | ○ good (1) | 0.2 | 5.8 |
| EXAMPLE 42 | Ni | 0.26 | 0.3 | 90 | ○ | ○ good (0.84) | ○ good (1) | 0.2 | 5.9 |
| EXAMPLE 43 | Ni | 0.41 | 0.3 | 90 | ○ | ○ good (1.05) | ○ good (1) | 0.2 | 5.9 |
| EXAMPLE 44 | Ni | 0.61 | 0.3 | 90 | ○ | ○ good (1.13) | ○ good (1) | 0.2 | 5.8 |
| EXAMPLE 45 | Ni | 0.84 | 0.3 | 90 | ○ | ○ good (1.18) | Δ fair (7) | 0.2 | 5.8 |
| EXAMPLE 46 | Ni | 0.96 | 0.3 | 90 | ○ | ○ good (1.19) | Δ fair (8) | 0.2 | 5.8 |
| EXAMPLE 47 | Ni | 1.05 | 0.3 | 90 | ○ | Δ fair (1.30) | Δ fair (9) | 0.2 | 5.8 |
| EXAMPLE 48 | Ni | 1.15 | 0.3 | 90 | ○ | Δ fair (1.35) | Δ fair (9) | 0.2 | 5.8 |

What is claimed is:

1. An ultrafine metal powder slurry comprising:
   an organic solvent;
   a surfactant; and
   an ultrafine metal powder,
   wherein the surfactant comprises non-neutralized acid oleoyl sarcosine, the content of the ultrafine metal powder is in the range of 70 to 95 percent by mass, and the content of the surfactant is in a range of more than 0.05 to less than 2 parts by mass relative to 100 parts by mass of the ultrafine metal powder, and
   wherein the ultrafine metal powder comprises a nickel alloy containing nickel and at least one of vanadium, niobium, molybdenum, tantalum, tungsten, zirconium, yttrium, lanthanum, magnesium, titanium, barium, and calcium.

2. An ultrafine metal powder slurry comprising:
   70 to 95 percent by mass of an ultrafine metal powder;
   more than 0.05 to less than 2 parts by mass of non-neutralized acid oleoyl sarcosine as a surfactant relative to 100 parts by mass of the ultrafine metal powder; and
   an organic solvent as a balance,
   wherein a particle size distribution D90 of the ultrafine metal powder is less than 1.2 μm, and a particle size distribution D50 indicating the mean particle diameter is in a range of 0.1 to 1.0 μm.

3. An ultrafine metal powder slurry comprising:
   an organic solvent;
   a surfactant; and
   an ultrafine metal powder,
   wherein the surfactant comprises non-neutralized acid oleoyl sarcosine, the content of the ultrafine metal powder is in the range of 70 to 95 percent by mass, and the content of the surfactant is in a range of more than 0.05 to less than 2 parts by mass relative to 100 parts by mass of the ultrafine metal powder,
   the ultrafine metal powder slurry having a specific density of 5 to 6 g/cm$^3$.

4. An ultrafine metal powder slurry comprising:
   an organic solvent;
   a surfactant; and
   an ultrafine metal powder,
   wherein the surfactant comprises non-neutralized acid oleoyl sarcosine, the content of the ultrafine metal powder is in the range of 70 to 95 percent by mass, the content of the surfactant is in a range of more than 0.05 to less than 2 parts by mass relative to 100 parts by mass of the ultrafine metal powder, a particle size distribution D90 of the ultrafine metal powder is less than 1.2 μm, and a particle size distribution D50 indicating the mean particle diameter is in a range of 0.1 to 1.0 μm.

5. The ultrafine metal powder slurry according to claim 4, wherein the ultrafine metal powder comprises at least one of nickel, copper, silver, molybdenum, tungsten, cobalt, and tantalum.

6. The ultrafine metal powder slurry according to claim 4, wherein the ultrafine metal powder comprises a nickel alloy containing nickel and at least one of vanadium, niobium, molybdenum, tantalum, tungsten, zirconium, yttrium, lanthanum, magnesium, titanium, barium, and calcium.

7. The ultrafine metal powder slurry according to claim 4 having a specific density of 5 to 6 g/cm$^3$.

* * * * *